United States Patent
Hartmann et al.

(10) Patent No.: US 9,691,282 B2
(45) Date of Patent: Jun. 27, 2017

(54) LIMITING THE ACTIVATION OF AN EMERGENCY STEER ASSISTANT

(75) Inventors: Andreas Hartmann, Aßmannshardt (DE); Ning Bian, Frankfurt am Main (DE); Kai Bretzigheimer, Mainz (DE); Thorsten Staab, Hösbach (DE); Daniel Förster, Darmstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 656 days.

(21) Appl. No.: 14/002,402

(22) PCT Filed: Feb. 29, 2012

(86) PCT No.: PCT/DE2012/100049
§ 371 (c)(1),
(2), (4) Date: Jun. 11, 2014

(87) PCT Pub. No.: WO2012/119595
PCT Pub. Date: Sep. 13, 2012

(65) Prior Publication Data
US 2014/0303845 A1    Oct. 9, 2014

(30) Foreign Application Priority Data
Mar. 4, 2011    (DE) .................. 10 2011 005 094

(51) Int. Cl.
| | |
|---|---|
| *A01B 69/00* | (2006.01) |
| *G08G 1/16* | (2006.01) |
| *B60W 10/18* | (2012.01) |
| *B60W 10/20* | (2006.01) |
| *B60W 30/09* | (2012.01) |
| *B60W 30/095* | (2012.01) |
| *B60W 50/16* | (2012.01) |

(52) U.S. Cl.
CPC ............. *G08G 1/165* (2013.01); *B60W 10/18* (2013.01); *B60W 10/20* (2013.01); *B60W 30/09* (2013.01);
(Continued)

(58) Field of Classification Search
CPC .................................................... B60R 21/34
(Continued)

(56) References Cited

U.S. PATENT DOCUMENTS

| | | |
|---|---|---|
| 6,926,374 B2 | 8/2005 | Dudeck et al. |
| 7,109,854 B2 | 9/2006 | Dobler |

(Continued)

FOREIGN PATENT DOCUMENTS

| | | |
|---|---|---|
| DE | 100 36 276 A1 | 2/2002 |
| DE | 103 36 986 A1 | 3/2005 |

(Continued)

OTHER PUBLICATIONS

International Preliminary Report on Patentability corresponding to patent application PCT/DE2012/100049, mailed Sep. 19, 2013, with translation.

(Continued)

*Primary Examiner* — Redhwan K Mawari
(74) *Attorney, Agent, or Firm* — RatnerPrestia

(57) ABSTRACT

A method for a driver assistance system for a vehicle is specified, wherein objects in the surroundings of a vehicle are detected on the basis of data of a system that covers the surroundings, and a potential free zone in which only no objects and/or objects which the vehicle can drive over have been reliably detected is determined. The potential free zone is verified by further vehicle and/or surroundings information.

11 Claims, 2 Drawing Sheets

(52) U.S. Cl.
CPC .... *B60W 30/0953* (2013.01); *B60W 30/0956* (2013.01); *B60W 50/16* (2013.01); *G08G 1/166* (2013.01); *G08G 1/167* (2013.01); *B60W 2420/52* (2013.01); *B60W 2520/10* (2013.01); *B60W 2520/125* (2013.01); *B60W 2520/14* (2013.01); *B60W 2520/28* (2013.01); *B60W 2540/18* (2013.01); *B60W 2550/402* (2013.01)

(58) Field of Classification Search
USPC .......................................................... 701/36
See application file for complete search history.

(56) References Cited

U.S. PATENT DOCUMENTS

| | | | |
|---|---|---|---|
| 7,705,772 B1* | 4/2010 | Shelton | G01S 7/354 342/104 |
| 8,238,606 B2 | 8/2012 | Sasaki | |
| 2010/0063676 A1* | 3/2010 | Ito | B60R 21/0134 701/36 |
| 2012/0221168 A1* | 8/2012 | Zeng | G08G 1/09626 701/1 |

FOREIGN PATENT DOCUMENTS

| | | |
|---|---|---|
| DE | 10 2005 005 720 A1 | 8/2006 |
| DE | 10 2009 025 607 A1 | 2/2010 |
| EP | 1 684 142 A1 | 7/2006 |
| JP | 2004530997 | 10/2004 |
| JP | 2008260390 | 10/2008 |
| JP | 2009271758 | 11/2009 |
| JP | 2010237874 | 10/2010 |

OTHER PUBLICATIONS

International Search Report for PCT/DE2012/100049 mailed Jul. 18, 2012.
Japanese Office Action mailed Oct. 19, 2016 for Japanese Application No. 2013-555757, 3 pages.

* cited by examiner

LIMITING THE ACTIVATION OF AN EMERGENCY STEER ASSISTANT

CROSS REFERENCE TO RELATED APPLICATIONS

This application is the U.S. National Phase Application of PCT/DE2012/100049, filed Feb. 29, 2012, which claims priority to German Patent Application No. 10 2011 005 094.9, filed Mar. 4, 2011, the contents of such applications being incorporated by reference herein.

FIELD OF THE INVENTION

The present invention relates to a method for a driver assistance system, e.g., for performing an evasive maneuver and/or an emergency braking maneuver and/or for issuing a collision warning.

BACKGROUND OF THE INVENTION

Surroundings-sensor-based EBA (Emergency Brake Assist) systems or collision mitigation systems (CMS) are known. These systems are based on sensors covering the surroundings, which sensors are usually radar sensors mounted on the vehicle front. The systems cover the region in front of the vehicle and are capable of assessing the risk of collisions with vehicles driving ahead or objects lying ahead.

These systems aim at assisting the driver in critical situations (risk of rear-end collisions) when the driver has to perform an emergency braking maneuver, wherein the assistance consists in, e.g., prefilling the brake system or lowering the tripping limits for the hydraulic braking assistant. Recently developed systems automatically initiate vehicle braking, even without involving the driver where appropriate. Depending on the respective design, the duration and/or intensity and/or gradient of said braking are/is limited or unlimited.

Furthermore, FCW (Forward Collision Warning) systems are known, which warn the driver when there is a risk of collisions with vehicles driving ahead or objects lying ahead. Objects are detected by means of sensors covering the surroundings, such as radar sensors and/or camera systems. The driver is warned visually, acoustically and/or haptically, e.g., by a brief automatic build-up of brake pressure.

Emergency steering systems are a further development of forward collision warning systems and emergency braking systems. They are not commercially available yet, but are described in research and in numerous patent specifications.

For example, emergency steering systems can adapt vehicle behavior situationally and thus adapt it to a possible emergency steering situation, e.g., by rear-axle steering and stabilizer bars. Furthermore, emergency steering systems can warn the driver, e.g., visually, acoustically or haptically.

Furthermore, steering interventions and/or braking interventions can assist the driver during the emergency steering maneuver in order to perform a safe lane change. Furthermore, an automatic evasive maneuver can be performed by the system.

Usually, but not necessarily, an emergency steering system requires the effected activation of an emergency braking system. Especially with high relative velocities and with low coefficients of friction, an evasive maneuver is mostly still possible much later than a braking maneuver in order to avoid a collision. Since a braking maneuver is usually performed in one's own lane but is often safer than steering on account of the reduction of kinetic energy (steering resulting in lane departure results in being endangered by oncoming traffic, for example), the effected activation of an emergency braking system is a useful activation condition for an emergency steering system.

In particular, the occurrence of false positive errors when the system is not used must be avoided in order to ensure the operatability of the system according to, e.g., ISO 26262.

The operatability of forward collision warning systems and emergency braking systems is usually ensured by means of continuous runs, in which the data of the surroundings-covering systems (e.g., radar data) and data of the ego-vehicle (CAN data) are recorded. Thus, by a software-based simulation of the signal processing chain, false positive errors can be detected and statistically analyzed. In this way, the robustness of systems the activation of which is based on the positive piece of sensor information "Object Detected" can be ensured. Such systems are, e.g., forward collision warning systems and emergency braking systems. For example, the detection of an object that does not really exist is a false positive error. For example, such misinterpretations may occur when radar systems detect bridges. Therefore, with above-mentioned functions, a false-positive-error activation of a function can be mostly put down to a false positive error of the system that covers the surroundings. The opposite is the case when a free zone is detected for an emergency steer assistant, where the non-existence of objects in the zone into which the vehicle can move when performing an evasive maneuver must be reliably detected. Therefore, a surroundings-covering system that avoids false negative errors is required for ensuring the operatability of an emergency steer assistant.

SUMMARY OF THE INVENTION

An aspect of the present invention is to effectively assist a driver of a vehicle when there is a risk of a collision and to reliably detect a zone into which the vehicle can move when performing an evasive maneuver.

This aspect is achieved by the features of the independent claims, which specify a method and a device for the reliable detection of a free zone for an emergency steer assistant.

The inventive method is designed for a driver assistance system for a vehicle. To this end, objects in the surroundings of a vehicle are detected on the basis of data of a system that covers the surroundings. Furthermore, a potential free zone is determined, i.e., a zone in which only no objects and/or objects which the vehicle can drive over (e.g., traffic lines) have been reliably detected by the system that covers the surroundings. If a potential free zone is determined, it must be verified on the basis of further vehicle and/or surroundings information prior to, e.g., an output to a driver or an automatic steering or braking intervention on the basis of the verified free zone.

The subject matter of the present invention is a reliable detection of a free zone for driver assistance systems in order to avoid unreasonable risks to participants in traffic. For example, an evasive maneuver is recommended or an automatic steering intervention is initiated only in the event of a "positive detection" of a traffic situation as one or several additional activation condition/s.

In particular, the verification consists in checking whether the free zone is a pavement. In the present invention, the term "pavement" is used to describe a zone which a vehicle can cross safely. Said zone comprises, e.g., a zone without any raised objects which the vehicle cannot drive over and/or a zone having a planar bottom in order to, e.g., prevent vehicles from performing evasive maneuvers in such a way that they finally drive into the roadside ditch. In particular, a pavement is verified on the basis of one or several of the following criteria:

- detection of traffic lines, which are usually arranged on the edge of a pavement, particularly by means of a surroundings-covering system that is realized, e.g., as a camera system;
- detection of a roadside structure, particularly by means of a surroundings-covering system;
- previous presence of other vehicles in the potential free zone, which is an indicator for a zone which a vehicle can cross, wherein the other vehicles were preferably detected by means of a surroundings-covering system;
- information from an electronic map when detecting the ego-position by means of a locating system, wherein information from the electronic map gives hints on the surroundings of the vehicle.

In a further positive realization of the invention, the verification consists in checking the value of the probability of the presence of difficult-to-detect objects (particularly pedestrians or oncoming traffic) in a potential free zone, and the potential free zone is not verified when the probability value is above a particular threshold value.

In particular, a probability value is determined on the basis of the surroundings of the vehicle.

In a preferred realization of the invention, an increased probability value for a pedestrian is assumed depending on one or several of the following criteria:

- surroundings of a pedestrian crosswalk, wherein the pedestrian crosswalk is detected particularly on the basis of information from an electronic map when detecting the ego-position by means of a locating system and/or by means of a surroundings-covering sensor, particularly a camera sensor system and/or a LIDAR sensor system;
- speed of ego-vehicle below a particular threshold value, wherein said threshold value is used, e.g., as an indicator for a driving situation within a town or a built-up area with an increased probability value for pedestrians; said threshold value is preferably between 30 and 100 km/h, particularly from 50 to 70 km/h;
- a sidewalk detected particularly on the basis of information from an electronic map when detecting the ego-position by means of a locating system and/or by means of a surroundings-covering sensor and taken as an indicator for an area with an increased probability value for pedestrians.

In a preferred realization of the invention, a probability of oncoming traffic is assessed depending on one or several of the following criteria:

- speed of ego-vehicle above a particular threshold value (low probability of oncoming traffic);
- detection (preferably by means of a surroundings-covering system) of road signs (particularly speed limit signs) that indicate, on account of their type (e.g., speed limits higher than 100 km/h), the presence of an opposite lane separated by constructional measures (low probability of oncoming traffic);
- determination of the number of lanes on the basis of the detection of traffic lines, particularly by means of a surroundings-covering system (preferably, a low probability of oncoming traffic is assumed when the number of lanes is high);
- detection of a roadside structure, particularly by means of a surroundings-covering system, wherein other vehicles that are present on the same side of the detected roadside structure as the ego-vehicle are moving in the same direction as the ego-vehicle (preferably, low probability of oncoming traffic);
- information from an electronic map when detecting the ego-position by means of a locating system.

In a particular realization of the invention, the above-described detection of a free zone is employed in an emergency steering assistance system. For example, an emergency steering assistance system initiates an automatic evasive maneuver directing the vehicle into a free zone, or a driver is recommended to perform an evasive maneuver. In particular, a recommendation to perform an evasive maneuver is issued to the driver visually and/or acoustically and/or haptically. A positive realization of the invention alternatively or additionally provides, depending on the verified free zone, the issuing of a collision warning to a driver and/or the automatic initiation of an emergency braking maneuver. If there is no verified free zone (no possibility of performing an evasive maneuver), a warning is issued or an automatic braking intervention is initiated earlier than in a situation in which an evasive maneuver is still possible.

BRIEF DESCRIPTION OF THE DRAWINGS

In the following, the invention will be explained in greater detail on the basis of figures and exemplary embodiments.

DETAILED DESCRIPTION OF THE INVENTION

Figure 1:
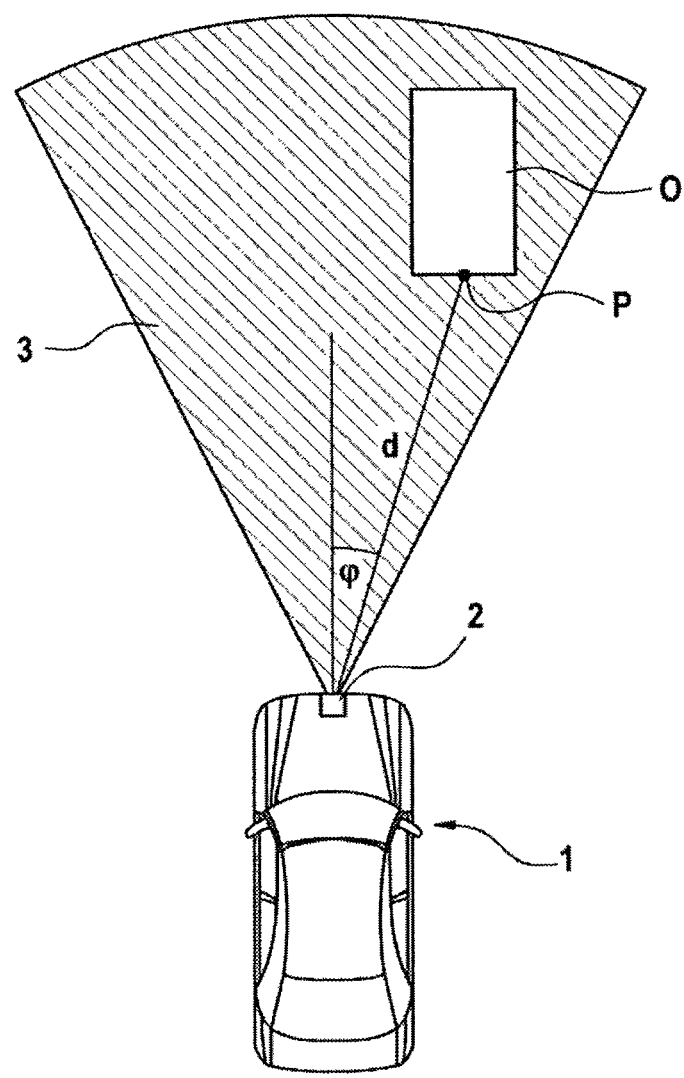
FIG. 1 shows, by way of example, a vehicle 1 having four wheels, two axles and a surroundings sensor 2.

FIG. 1 shows, by way of example, a vehicle 1 having four wheels, two axles and a surroundings sensor 2. By means of said sensor 2, objects O in the surroundings of the vehicle can be detected. In particular, said objects O are further motor vehicles moving in the same lane or in an adjacent lane at the side of and/or in front of vehicle 1.

The vehicle preferably has one further surroundings sensor or several further surroundings sensors covering a region next to and/or behind the vehicle. FIG. 1 does not show the region covered by said sensor/s.

Objects O may also be static or almost static objects, e.g., trees, pedestrians or pavement boundaries. FIG. 1 shows, by way of example, a surroundings sensor 2 covering a region 3, which region comprises a solid angle in front of vehicle 1, in which an object O is shown by way of example. The surroundings sensor 2 is, e.g., a LIDAR (Light Detection and Ranging) sensor known per se to a person skilled in the art. However, other surroundings sensors may be used as well. The sensor measures the distances d to the detected points of an object and the angles $\phi$ between the central longitudinal axis of the vehicle and the straight connecting lines extending from the sensor to said points (shown in FIG. 1 by way of example for a point P of object O). Those fronts of the detected objects which face vehicle 1 are composed of several detected points, for which the sensor signals are transmitted; the correlations between points and the shape of an object are established and a reference point for object O is determined. For example, the center of object O or the center of the detected points of the object may be selected as a reference point. In contrast to a radar sensor (Doppler effect), the LIDAR surroundings sensor 2 cannot directly measure the velocities of the detected points and thus the velocities of the detected objects. They are calculated in a cyclically operating object detection unit 21 from the difference between the distances measured in successive time steps. In a similar way, the acceleration of the objects can be determined, in principle, by differentiating the positions of the objects twice.

Figure 2:
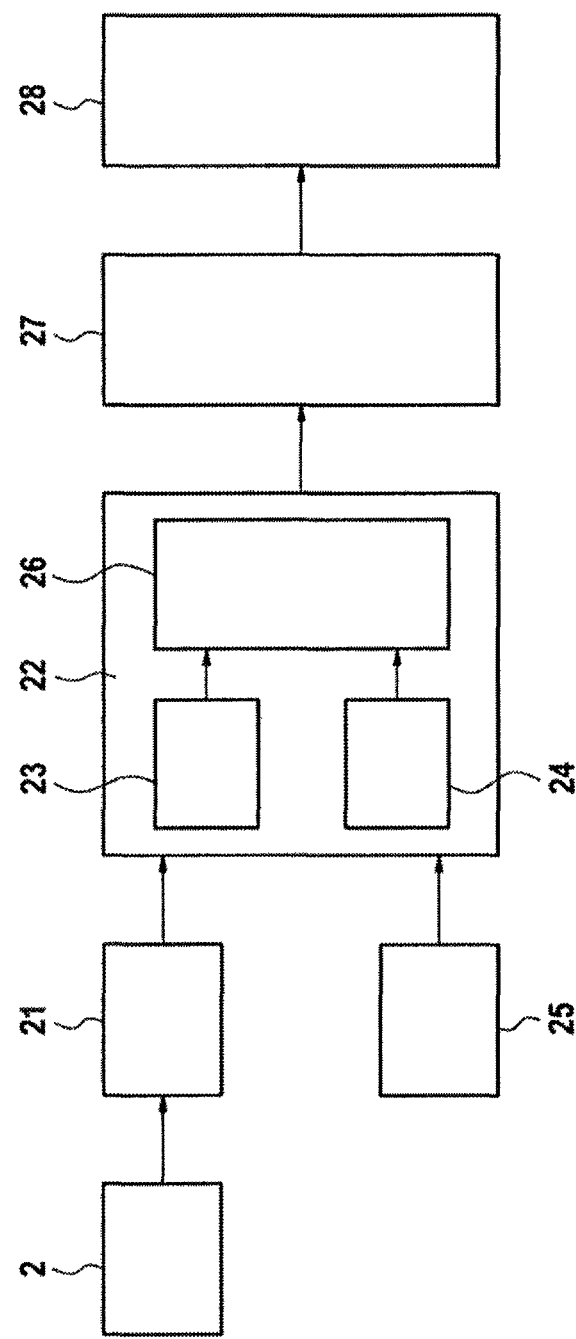
FIG. 2 is a schematic representation of a driver assistance system.

FIG. 2 is a schematic representation of a driver assistance system. With the exception of sensors and actuators, the components of said system are preferably software modules implemented within vehicle 1 by means of a microprocessor. As shown in FIG. 2, the object data are transmitted within the schematically represented driver assistance system to a decision device 22 in the form of electronic signals. In block 23 in the decision device 22, an object trajectory is determined on the basis of the information on object O. Furthermore, a trajectory of vehicle 1 is determined in block 24 on the basis of information on the state of the dynamics of movement of vehicle 1. Said information is determined by means of further vehicle sensors 25, wherein, in particular, the vehicle speed, which can be determined by means of, e.g., wheel rpm sensors, the steering angle $\delta$ on the steerable wheels of vehicle 1, which is measured by means of a steering-angle sensor, the yaw rate and/or the lateral acceleration of vehicle 1, which are measured by means of corresponding sensors, are used. Moreover, model-based quantities can be calculated/estimated on the basis of the states of the dynamics of vehicle movement measured by means of the vehicle sensors 25. The next step consists in checking (in block 26 in decision device 22) whether the motor vehicle 1 is on a collision course with one of the detected objects O. If such a collision course is determined and the TTC (Time To Collision, i.e., the period of time until the determined collision with object O), which is determined in the decision device 22 as well, falls below a particular value, a triggering signal is transmitted to a path-setting device 27. The triggering signal results in the calculation of an alternative path y(x) within the path-setting device in a first step, whereafter a starting point for the evasive maneuver is fixed on the basis of the determined alternative path y(x), at which starting point the evasive maneuver must be started in order to be able to just get out of the way of object O. These steps are preferably repeated in time steps until there is no risk of collision on account of changes of the course of object O or of vehicle 1 any more or until the vehicle 1 has reached the starting point for an evasive maneuver. In that event, the alternative path y(x) or parameters that represent said path are transmitted to a steering-actuator controlling means 28, which then actuates an electromechanically actuatable front-wheel steering device V and generates a vibration which the driver can feel at the steering wheel of his or her motor vehicle 1. This warning X1 draws the driver's attention to the fact that the motor vehicle 1 driven by him or her is on a collision course with an object O. The course change performed by the driver is detected through the change of the steering angle $\delta$V, i.e., through the derivative of the steering angle of the front wheels with respect to time $\dot{\delta}$ V.

In order to prevent an emergency steering system that requires the detection of a free zone from exclusively depending on the reliability and covering of surroundings-sensor-based free-zone detection with respect to functional robustness against false positive errors, the system is only activated when traffic situations or surroundings conditions are identified unambiguously.

To this end, additional activation conditions are included in the present invention.

In contrast to free-zone detection, the additional conditions must be based on "positive detection".

The positively detected data must allow unambiguous conclusions to be drawn about the traffic situation or surroundings conditions of the ego-vehicle. Thus, activation can be limited to traffic situations or surroundings conditions in/under which the probability of reliable free-zone detection based on contemporary surroundings-covering sensors is high or activation is unlikely to constitute unreasonable risks to, e.g., pedestrians who are present in the supposed free zone or, e.g., a roadside ditch.

These conditions go beyond the known activation condition of an already effected activation of an emergency braking system. An identified emergency braking situation does not sufficiently indicate a traffic situation or surroundings conditions in/under which the probability of reliable free-zone detection based on contemporary surroundings-covering sensors is high or activation is unlikely to constitute unreasonable risks.

In an advantageous embodiment of the invention, a traffic situation or surroundings condition may represent adjacent-lane pavement markings detected, e.g., by means of a camera-based lane detection system. If an adjacent lane is unambiguously identified as such (e.g., if pavement markings left of and right of the adjacent lane are detected), one can assume that the detected structure is, in all probability, a road and not, e.g., a ditch.

The probability of performing an activation in a traffic situation or under a surroundings condition in/under which such activation is inappropriate (particularly in the case of a pedestrian crosswalk) can be further reduced by extending the range of required unambiguously identified conditions.

Further conditions are, e.g.:
minimum speed of ego-vehicle detected by means of, e.g., wheel rpm sensors; high speed means low probability of intra-city traffic situation and thus low probability of presence of pedestrians;
position of ego-vehicle detected by means of navigation data with GPS positioning and map material, e.g., detection of position of vehicle on a three-lane freeway: low probability of presence of pedestrians;
roadside structure detected by means of existing surroundings-covering systems; said roadside structure forms boundary of a road;
other vehicles detected by means of existing surroundings-covering systems: high probability of presence of a traffic lane.

The invention claimed is:

1. A method for a driver assistance system for a vehicle, the method comprising:
    detecting, by a first vehicle sensor, objects in the surroundings of the vehicle on the basis of data of a system that covers the surroundings, the first sensor measuring distance to the object or capturing an image of the object;
    determining, based on the detection of the first vehicle sensor, a potential free zone in which only no objects and/or objects which the vehicle can drive over have been reliably detected;
    detecting, by a second vehicle sensor, further vehicle and/or surroundings information, the second sensor measuring distance to the object or capturing an image of the object;
    verifying that the potential free zone only includes no objects and/or objects which the vehicle can drive over on the basis of the further vehicle and/or surroundings information captured by second vehicle sensor; and outputting control signals to a driver or an automatic steering or braking intervention for controlling the vehicle to enter the verified free zone.

2. The method according to claim 1, wherein the verification comprises checking whether the free zone is a pavement.

3. The method according to claim 2, wherein the pavement is verified on the basis of at least one of the following criteria:
   detection of traffic lines, by a surroundings-covering system,
   detection of a roadside structure, by the surroundings-covering system,
   previous presence of other vehicles in the potential free zone, and
   information from an electronic map when detecting the ego-position by a locating system.

4. The method according to claim 1,
   wherein the verification comprises checking a value of a probability of the presence of difficult-to-detect objects by the first vehicle sensor and the second vehicle sensor, particularly pedestrians or oncoming traffic, in the potential free zone.

5. The method according to claim 4, wherein the probability value is determined on the basis of the surroundings of a vehicle.

6. The method according to claim 5, wherein an increased probability value for a pedestrian is assumed depending on at least one of the following criteria:
   in the surroundings of a pedestrian crosswalk, wherein the pedestrian crosswalk is detected particularly on the basis of information from an electronic map when detecting the ego-position by a locating system and/or by a surroundings-covering sensor,
   speed of ego-vehicle is below a particular threshold value, and
   on a sidewalk, wherein the sidewalk is detected particularly on the basis of information from an electronic map when detecting the ego-position by the locating system and/or by the surroundings-covering sensor.

7. The method according to claim 5, wherein the probability value for oncoming traffic is determined depending on at least one of the following criteria:
   speed of ego-vehicle is above a particular threshold value,
   detection of road signs, including speed limit signs, that indicate, on account of their type, the presence of an opposite lane separated by constructional measures,
   number of lanes, determined on the basis of the detection of traffic lines,
   detection of a roadside structure, by a surroundings-covering system, wherein the direction of motion of other vehicles that are present on the same side of the detected roadside structure is analyzed, and
   information from an electronic map when detecting the ego-position by a locating system.

8. The method according to claim 1, wherein an evasive function is activated on the basis of the verified free zone.

9. The method according to claim 1, wherein when there is a risk of collision, a collision warning or an automatic decelerating intervention is initiated earlier if no verified free zone was detected.

10. A driver assistance system for a vehicle comprising:
    a surroundings-covering system: 1) detecting, with a first vehicle sensor, objects in the surroundings of a vehicle, the first sensor measuring distance to the object or capturing an image of the object, and 2) detecting, by a second vehicle sensor, further vehicles and/or surroundings information, the second sensor measuring distance to the object or capturing an image of the object;
    a processor for:
        determining, based on the detection of the first vehicle sensor, a potential free zone in which only no objects and/or objects which the vehicle can drive over have been reliably detected,
        verifying that the potential free zone only includes no objects and/or objects which the vehicle can driver over on the basis of the further vehicle and/or surroundings information captured by the second vehicle sensor, and
        carrying out an evasive function and/or warning a driver of a and/or decelerating a vehicle depending on the verified free zone.

11. The driver assistance system according to claim 10, wherein the evasive function comprises an automatic steering intervention or in recommending the driver to perform an evasive maneuver.

* * * * *